United States Patent [19]

Russell et al.

[11] Patent Number: 4,999,920
[45] Date of Patent: Mar. 19, 1991

[54] SURVEYING OF BOREHOLES

[76] Inventors: Anthony W. Russell, Drachlaw, Turriff, Aberdeenshire AB5 7JB; Michael K. Russell, Lynworth House, High Street, Prestbury, Cheltenham, Gloucester GL52 3AU, both of Great Britain

[21] Appl. No.: 363,681

[22] Filed: Jun. 9, 1989

[30] Foreign Application Priority Data

Jun. 23, 1988 [GB] United Kingdom ............... 8814926

[51] Int. Cl.$^5$ .......................................... E21B 47/022
[52] U.S. Cl. ........................................ 33/304; 33/312
[58] Field of Search ................ 33/301, 302, 304, 361, 33/312, 313

[56] References Cited

U.S. PATENT DOCUMENTS

| | | | |
|---|---|---|---|
| 3,862,499 | 1/1975 | Isham et al. | 33/302 X |
| 4,510,696 | 4/1985 | Roesler | 33/304 |
| 4,682,421 | 7/1987 | Dongen et al. | 33/302 |
| 4,709,486 | 12/1987 | Walters | 33/304 |
| 4,819,336 | 4/1989 | Russell | 33/304 |

*Primary Examiner*—Harry N. Haroian
*Attorney, Agent, or Firm*—Ratner & Prestia

[57] ABSTRACT

A method of deriving the true magnitude of the terrestial magnetic field in the direction of the longitudinal axis of a borehole at a region of the borehold occupied by an instrumentation package equipped with magnetic vector measuring means for measuring the lateral magnetic vectors Bx and By and further equipped with gravitational vector measuring means for measuring each of the three gravitational vectors Gx, Gy, and Gz. The method comprises the steps of performing said measurements of the magnetic vectors and the gravitational vectors and from said vector measurements solving the equation:

$$Bze = (Bve.Ge - Bx.Gx - By.Gy)/Gz$$

where BVe is the vertical component of the terrestial magnetic field at the location of the borehole, and Ge is the terrestial gravity field. The terrestial gravity field Ge may be derived as the square root of the sum of the individual squares of the individual gravity vectors Gx, Gy and Gz, according to the equation:

$$Ge = (Gx^2 + Gy^2 + Gz^2)^{\frac{1}{2}}.$$

The invention is based on the assumption that the vector measurements, and in particular the lateral magnetic vectors, are substantially uncorrupted by the drillstring or the bottom-hole assembly.

5 Claims, 2 Drawing Sheets

SURVEYING OF BOREHOLES

This invention relates to the surveying of boreholes, and more particularly but not exclusively to determining the true azimuth of a borehole.

BACKGROUND OF THE INVENTION

When drilling a well for exploration and recovery of oil or gas, it is known to drill a deviated well, which is a well whose borehole intentionally departs from vertical by a significant extent over at least part of its depth. When a single drilling rig is offshore, a cluster of deviated wells drilled from that rig allows a wider area and a bigger volume to be tapped from the single drilling rig at one time and without expensive and time-consuming relocation of the rig than by utilising only undeviated wells. Deviated wells also allow obstructions to be bypassed during drilling, by suitable control of the deviation of the borehole as it is drilled. However, to obtain the full potential benefits of well deviation requires precise knowledge of the instantaneous location and heading of the bottom-hole assembly (including the drilling bit and steering mechanism such as adjustable stabilisers). Depth of the bottom-hole assembly (or axial length of the borehole) can be determined from the surface, for example by counting the number of standard-length tubulars coupled into the drillstring, or by less empirical procedures. However, determination of the location and heading of the bottom-hole assembly generally requires some form of downhole measurement of heading. Integration of heading with respect to axial length of the borehole will give the borehole location relative to the drilling rig.

In this context, the word "heading" is being used to denote the direction in which the bottom-hole assembly is pointing (i.e., has its longitudinal axis aligned), both in a horizontal and vertical sense. Over any length of the borehole which can be considered as straight for the purposes of directional analysis, the borehole axis in a deviated well will have a certain inclination with respect to true vertical. A vertical plane including this nominally straight length of borehole will have a certain angle (measured in a horizontal plane) with respect to a vertical plane including a standard direction; this standard direction is hereafter taken to be true Magnetic North, and the said angle is the magnetic azimuth of the length of borehole under consideration (hereafter simply referred to as "azimuth"). The combination of inclination and azimuth at any point down the borehole is the heading of the borehole at that point; borehole heading can vary with depth as might be the case, for example, when drilling around an obstacle.

Instrumentation packages are known, which can be incorporated in bottom-hole assemblies to measure gravity and magnetism in a number of orthogonal directions related to the heading of the bottom-hole assembly. Mathematical manipulations of undistorted measurements of gravitational and magnetic vectors can produce results which are representative of the true heading at the point at which the readings were taken. However, the measurements of magnetic vectors are susceptible to distortion, not least because of the masses of ferrous materials incorporated in the drillstring. Distortion of one or more magnetic vector measurements can give rise to unacceptable errors in the determination of heading, and undesirable consequences. Distortion of magnetic vectors in the region of the instrumentation arising from inherent magnetism of conventional drillstring components can be mitigated by locating the instrumentation in a special section of drillstring which is fabricated of non-magnetic alloy. However, such special non-magnetic drillstring sections are relatively expensive. Moreover, the length of non-magnetic section required to bring magnetic distortion down to an acceptable level increases significantly with increased mass of magnetic bottom-hole assembly and drillstring components, with consequent high cost in wells which use such heavier equipment, e.g. wells which are longer and/or deeper. Hence such forms of passive error correction may be economically unacceptable. Active error correction by the mathematical manipulation of vector readings which are assumed to be error-free or to have errors which are small may give unreliable results if the assumption is unwarranted.

It is therefore an object of the invention to provide an improved method of surveying a borehole.

Before describing the invention, several definitions will be detailed with reference to the accompanying drawings, wherein:

FIG. 1 is a schematic elevational view of the bottom-hole assembly of a drill string;, and FIG. 2 is a schematic perspective view of various axes utilised for denoting directions in three dimensions.

Referring first to FIG. 1, the bottom-hole assembly of a drill string comprises a drilling bit 10 coupled by a non-magnetic drill collar 12 and a set of drill collars 14 to a drill pipe 16. The drill collars 14 may be fabricated of a magnetic material, but the drill collar 12 is devoid of any self-magnetism.

The non-magnetic drill collar 12 houses a downhole instrumentation package schematically depicted at 18. (In reality, the package 18 would not be visible as is apparently the case in FIG. 1 since the package 18 is mounted within the interior of the collar 12). The downhole instrumentation package 18 is capable of measuring gravity vectors and local magnetic vectors, for example by the use of accelerometers and fluxgates respectively. The instrumentation package 18 is axially and rotationally fixed with respect to the bottom-hole assembly, including the drilling bit 10, whose heading is to be determined; the instrumentation package 18 is rigidly mounted in the bottom-hole assembly, in the non-magnetic drill collar 12 which is fabricated of non-magnetic alloy and has sufficient length to allow requisite measurements of local magnetic vectors without significant distortion (as detailed below the measured magnetic vectors are at right angles to the longitudinal axis of the drillstring and the inconsequentiality of the longitudinal magnetic distortion obviates the need for an especially long non-magnetic section to allow undistorted lateral magnetic vector measurements).

Referring now to FIG. 2 for convenience of conceptual presentation and calculational references, a hypothetical origin or omni-axial zero point "O" is deemed to exist in the centre of the instrumentation package 18 (not shown in FIG. 2). Of the three orthogonal axes OX, OY, and OZ defining the alignment of the instrumentation relative to the bottom-hole assembly, the OZ axis lies along the axis of the bottom-hole assembly, in a direction towards the bottom of the assembly and the bottom of a borehole 20 drilled by the drilling bit 10. The OX and OY axes, which are orthogonal to the OZ axis and therefore lie in a plane 0.N2.E1 (now defined as the "Z-plane") at right angles to the bottom-hole assembly axis OZ, are fixed with respect to the body (including the collar 12) of the bottom-hole assembly. As viewed from above, the OX axis is the first of the fixed axes which lies clockwise of the upper edge of the (inclined) bottom-hole assembly, this upper edge lying in the true azimuth plane 0.N2 N1.V of the bottom-hole assembly. The angle in the Z-plane 0.N2.E1 (at right angles to the OZ axis) between the bottom-hole assembly azimuth plane 0.N2.N1.V and the OX axis is the highside angle "HS". The OY axis lies in the Z-plane 0.N2.E1 at right angles to the OX axis in a clockwise direction as viewed from above. A gravity vector measuring accelerometer (or other suitable device) is fixedly aligned with each of the OX, OY, and OZ axes. A magnetic vector measuring fluxgate (or other suitable device) is fixedly aligned in each of the OX and OY axes. The instrumentation package 18 is specially constructed to make these measurements, or alternatively, the instrument package 18 may be adapted from a conventional instrument package having such devices and also an OZ fluxgate but which is redundant for the purposes of the present invention. The instrumentation package 18 may be energised by any suitable known arrangement, and the instrumentation readings may be telemetered directly or in coded form to a surface installation (normally the drilling rig) by any suitable known method, or alternatively the instrumentation package may incorporate computation means to process instrumentation readings and transmit computational results as distinct from raw data.

Also notionally vectored from the origin O are a true vertical (downwards) axis OV, a horizontal axis ON pointing horizontally to true Magnetic North, and an OE axis orthogonal to the OV and ON axes, the OE axis being at right angles clockwise in the horizontal plane as viewed from above (i.e., the OE axis is a notional East-pointing axis).

The vertical plane 0.N2.N1.V including the OZ axis and OV axis is the azimuth plane of the bottom-hole assembly. The angle between the OV axis and the OZ axis, i.e. the angle in the bottom-hole assembly azimuth plane 0.N2.N1.V, is the bottom-hole assembly inclination angle "INC"0 which is the true deviation of the longitudinal axis of the bottom-hole assembly from vertical.

The vertical plane 0.N.V including the OV axis and the ON axis is the reference azimuth plane or true Magnetic North. The angle measured in a horizontal plane 0.N.N1.E.E1 between the reference azimuth plane 0.N.V (including the OV axis and the ON axis) and the bottom-hole assembly azimuth plane 0.N2.N1.V (including the OV axis and the OZ axis) is the bottom-hole assembly azimuth angle "AZ".

The bottom-hole assembly and the instrumentation package 18 o are static during measurement to obtain bearing readings, due to temporary cessation of drillstring movement. Thus all the relevant angles are fixed during the making of a set of measurements to determine the bearing of the bottom-hole assembly.

The OX axis of the instrumentation package is related to the true Magnetic North axis ON by the vector sum of three angles as follows:

(1) horizontally from the ON axis round Eastwards (clockwise as viewed from above) to a horizontal axis ON1 in the bottom-hole assembly azimuth plane 0.N2.N1.V by the azimuth angle AZ (measured about the origin O in a horizontal plane);

(2) vertically upwards from the horizontal axis 0N1 in the azimuth plane 0.N2.N1.V to an inclined axis N2 in the Z-plane (the inclined plane 0.N2.E1 including the OX axis and the OY axis) by the inclination angle INC (measured about the origin O in a vertical plane including the origin O); and (3) a further angle clockwise/Eastwards (as defined above) in the Z-plane from the azimuth plane to the OX axis by the highside angle HS (measured about the origin O in the inclined Z-plane 0.N2.E1 which includes the origin O).

SUMMARY OF THE INVENTION

According to the present invention there is provided a method of deriving the true magnitude of the terrestial magnetic field Bze in the direction of the longitudinal axis of a borehole, hereinbefore defined as the OZ axis, at a region of the borehole occupied by an instrumentation package equipped with magnetic vector measuring means for measuring the magnetic vector Bx in the OX axis as hereinbefore defined and for measuring the magnetic vector By in the OY axis as hereinbefore defined, said instrumentation package being further equipped with gravitational vector measuring means for measuring the gravitational vector Gx in the OX axis, for measuring the gravitational vector Gy in the OY axis, and for measuring the gravitational vector Gz in the OZ axis, said method comprising the steps of performing said measurements of the magnetic vectors and the gravitational vectors and from said vector measurements solving the equation:

$$Bze = (BVe \cdot Ge - Bx \cdot Gx - By \cdot Gy)/Gz$$

where BVe is the vertical component of the terrestial magnetic field at the location of the borehole, and Ge is the terrestial gravity field. The terrestial gravity field Ge can be derived as the square root of the sum of the individual squares of the individual gravity vectors Gx, Gy, and Gz, as follows:

$$Ge = (Gx^2 + Gy^2 + Gz^2)^{\frac{1}{2}}.$$

The vertical component BVe of the terrestial magnetic field can either be measured locally as required, or obtained by looking up a map or table containing information appropriate to the locality (with or without interpolation as requisite).

DESCRIPTION OF PREFERRED EMBODIMENTS

Figure 1:
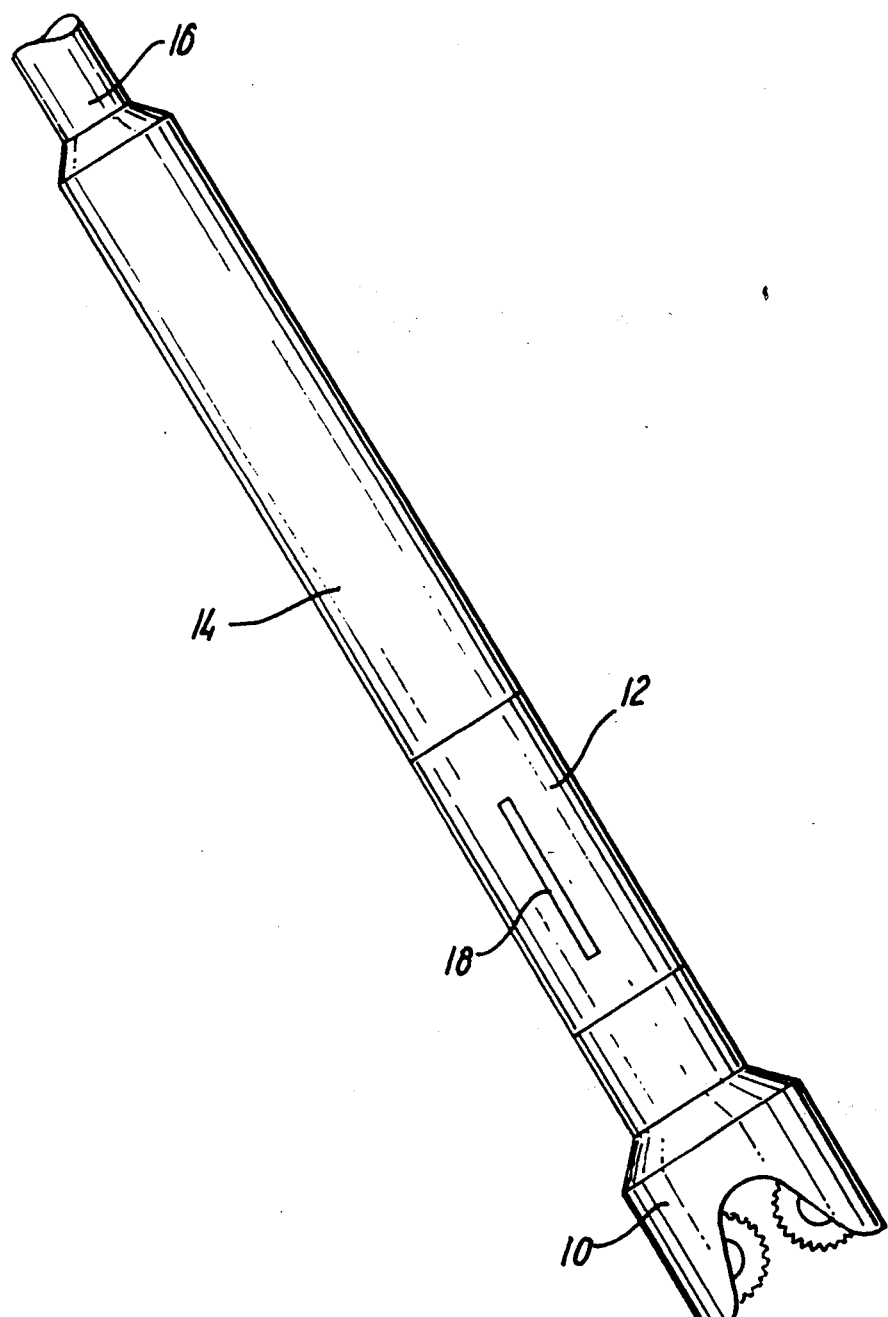
Figure 2:
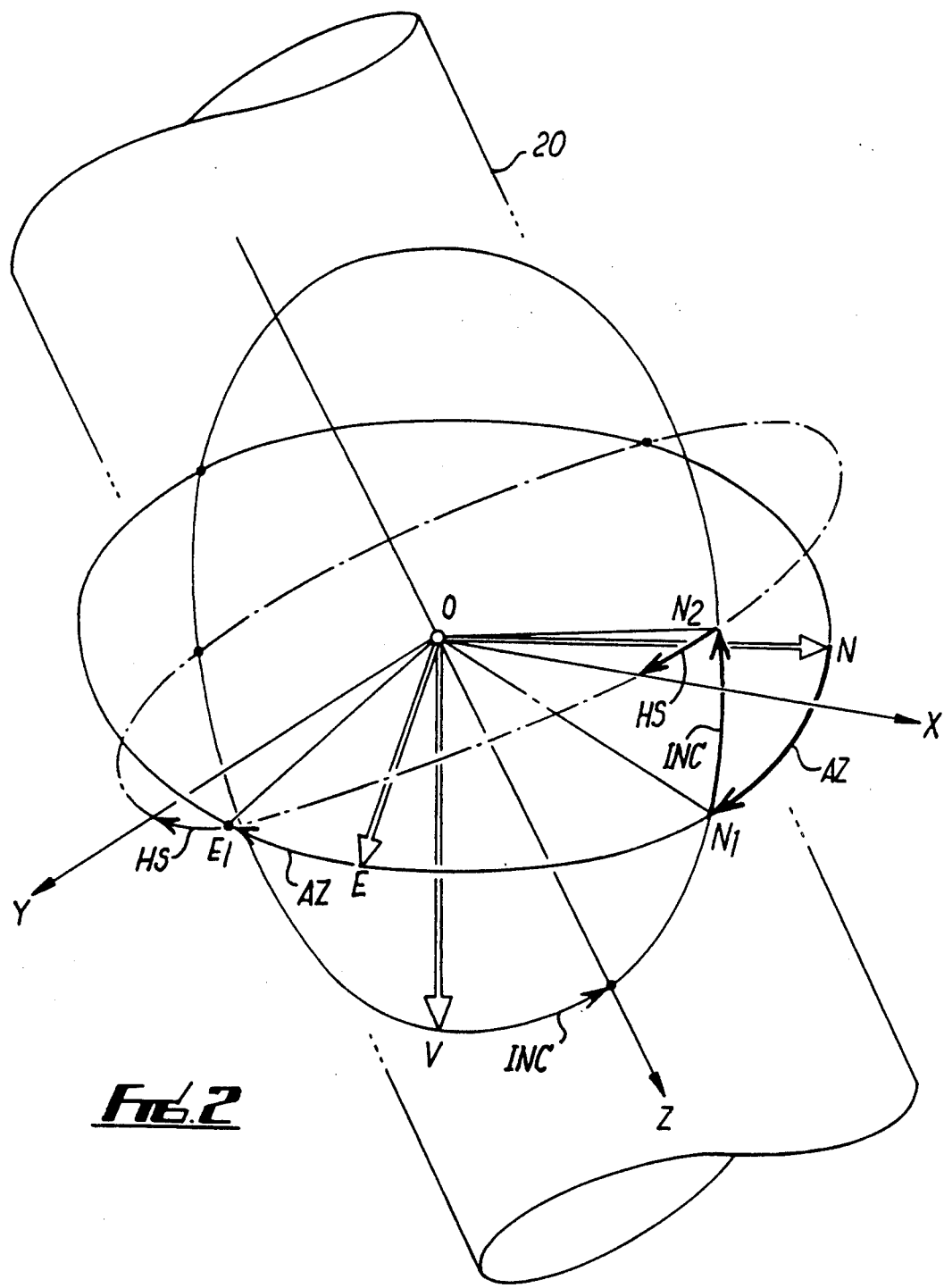

The invention is based on the assumption that the vector measurements Gx, Gy, Gz, Bx, and By are substantially uncorrupted by the drillstring or the bottom-hole assembly, and that the measured vectors are therefore substantially identical to the respective actual terrestial gravitational and magnetic vectors along the appropriate axes.

The utility of knowing Bze (or a substantially accurate approximation thereto) at a known depth or known axial distance down a borehole is that from the figure for Bze and from the other vector measurements, it is possible to derive the other essential directional parameters, namely the azimuth angle AZ, the inclination angle INC, and the highside angle HS. (Such derivation can be carried out by use of known equations). Thus the heading, and ultimately the position of the bottom-hole assembly, can be derived. Moreover, this valuable information is obtained without the need for excessively long and expensive non-magnetic drillstring components.

Unreliable or impracticable direct measurements of Bze are avoided (along with the need for a sensor to make such measurements).

The invention is not restricted to the specific forms described above, and modifications and variations can be adopted without departing from the scope of the invention as defined in the appended claims.

We claim:

1. A method implemented on a computer for measuring the true magnitude of the terrestrial magnetic field Bze in the direction of the longitudinal OZ axis of an instrumentation package equipped with magnetic vector measuring means for measuring the magnetic vector Bx in the OX axis and for measuring the magnetic vector By in the OY axis, said instrumentation package being further equipped with gravitational measuring means for measuring the gravitational vector Gx in the OX axis, for measuring the gravitational vector Gy in the OY axis, and for measuring the gravitational vector Gz in the OZ axis, said method comprising the steps of operating said magnetic vector measuring means while said instrumentation package is at a predetermined location in a borehole to produce said measurements of the magnetic vectors Bx and By, simultaneously operating said gravitational vector measuring means to produce said measurements of the gravitational vectors Gx, Gy, and Gz, and producing the true magnitude of the terrestrial magnetic field Bze in the direction of the longitudinal OZ axis from only a single set of the measurements of the gravitational vectors Gx, Gy and Gz and the magnetic vectors Bx and By performed at a single location and two known values:

BVe, the vertical component of the terrestrial magnetic field at the location of the borehole, and Ge, the terrestrial gravity field.

2. The method for measuring the true magnitude of the terrestrial magnetic field Bze of claim 1, wherein said step of producing the true magnitude of the terrestrial magnetic field Bze comprises computing the solution of the equation:

$$Bze = (BVe = (BVe.GE - Bx.GX - By.Gy)/GZ$$

where BVe is the vertical component of the terrestrial magnetic field at the location of the instrumentation package in the borehole, and Ge is the terrestrial gravity field.

3. A method as claimed in claim 1 wherein the terrestial gravity field Ge is derived as the square root of the sum of the individual squares of the individual gravity vectors Gx, Gy and Gz, according to the equation:

$$Ge = (Gz^2 + Gy^2 + Gz^2)^{\frac{1}{2}}.$$

4. A method as claimed in claim 1 wherein the vertical component BVe of the terrestial magnetic field is measured at the locality where the method is performed.

5. A method as claimed in claim 1 wherein the vertical component BVe of the terrestial magnetic field is obtained by looking up a map or table containing information appropriate to the locality where the method is performed.

* * * * *